Sept. 20, 1971  J. F. FLORY  3,606,397
FLUID SWIVEL WITH LOAD BEARING SHAFT
Filed Sept. 9, 1969  2 Sheets-Sheet 2

John F. Flory  INVENTOR

BY  Jay Simon  ATTORNEY

United States Patent Office 3,606,397
Patented Sept. 20, 1971

3,606,397
FLUID SWIVEL WITH LOAD BEARING SHAFT
John F. Flory, Morristown, N.J., assignor to
Esso Research and Engineering Company
Filed Sept. 9, 1969, Ser. No. 856,259
Int. Cl. F16l 27/08
U.S. Cl. 285—190                    10 Claims

ABSTRACT OF THE DISCLOSURE

A submersible fluid swivel joint capable of carrying substantial axial and bending loads, capable of conducting fluid, and adapted to be installed along the longitudinal axis of a load bearing fluid conduit is provided and comprises a swivel member rotatable with respect to a stationary sleeve and shaft, said swivel member being disposed circumferentially with respect to said shaft, and having an outlet port in fluid communication with said sleeve, said shaft being capable of supporting substantial axial and bending loads and being reinforced by radial webs disposed within said sleeve, the supporting webs integrally connecting said sleeve and said shaft.

FIELD OF THE INVENTION

This invention relates to a submersible fluid swivel joint. More particularly, this invention relates to a fluid swivel joint capable of supporting substantially large axial and bending loads, e.g., ship mooring loads. Still more particularly, this invention relates to a fluid swivel joint having a center load bearing element which allows for fluid passage and is capable of supporting large axial and bending stresses.

BACKGROUND OF THE INVENTION

With the advent of the so-called supertankers, i.e., tankers having a capacity of 200,000 to 300,000 dwt. and up to 500,000 dwt. single point mooring systems have become increasingly popular and desirable. Generally, a ship is moored by bow hawsers to a single point, such as a buoy, which is located in deep water outside of harbors. Deep water moorings become necessary when the depth of harbors is insufficient to accommodate the very deep draft of the supertankers. The tanker is allowed to rotate about the buoy, the buoy being connected to a mooring foundation anchored at the sea bottom. With such mooring systems it is highly desirable to integrate cargo handling facilities with the mooring system, for example, as shown in Ser. No. 856,445, filed Sept. 9, 1969, which describes a single point mooring system wherein a portion of the anchor leg is a rigid fluid conduit. Still referring to Ser. No. 856,445, a load bearing fluid swivel joint of the type described herein is mounted at the top of the rigid fluid conduit. Thus, the fluid swivel joint must be capable of withstanding the ship mooring load as well as providing a method for transferring cargo between the ship and the rigid conduit. As can be seen from Ser. No. 856,445, the direction of fluid flow is changed as it passes through the swivel joint, e.g., upwardly from the pipe and then outwardly to the ship.

SUMMARY OF THE INVENTION

In accordance with this invention, therefore, a submersible fluid swivel joint capable of supporting substantial axial and bending loads and adapted to be installed along the longitudinal axis of a load bearing fluid conduit is provided and comprises a cylindrical sleeve having an ingress port, a shaft coaxial with said sleeve, a plurality of supporting webs emanating from said shaft, the outer ends of said webs integrally connected to said sleeve, and a rotatable housing circumferentially disposed about said web in sealing relationship with said sleeve and rotatable with respect to said sleeve, said housing having an egress port in fluid communication with the ingress port of said sleeve, the egress port of the swivel housing being preferably disposed so as to change the direction of the fluid flowing into the sleeve.

DRAWING DESCRIPTION

Figure 1:
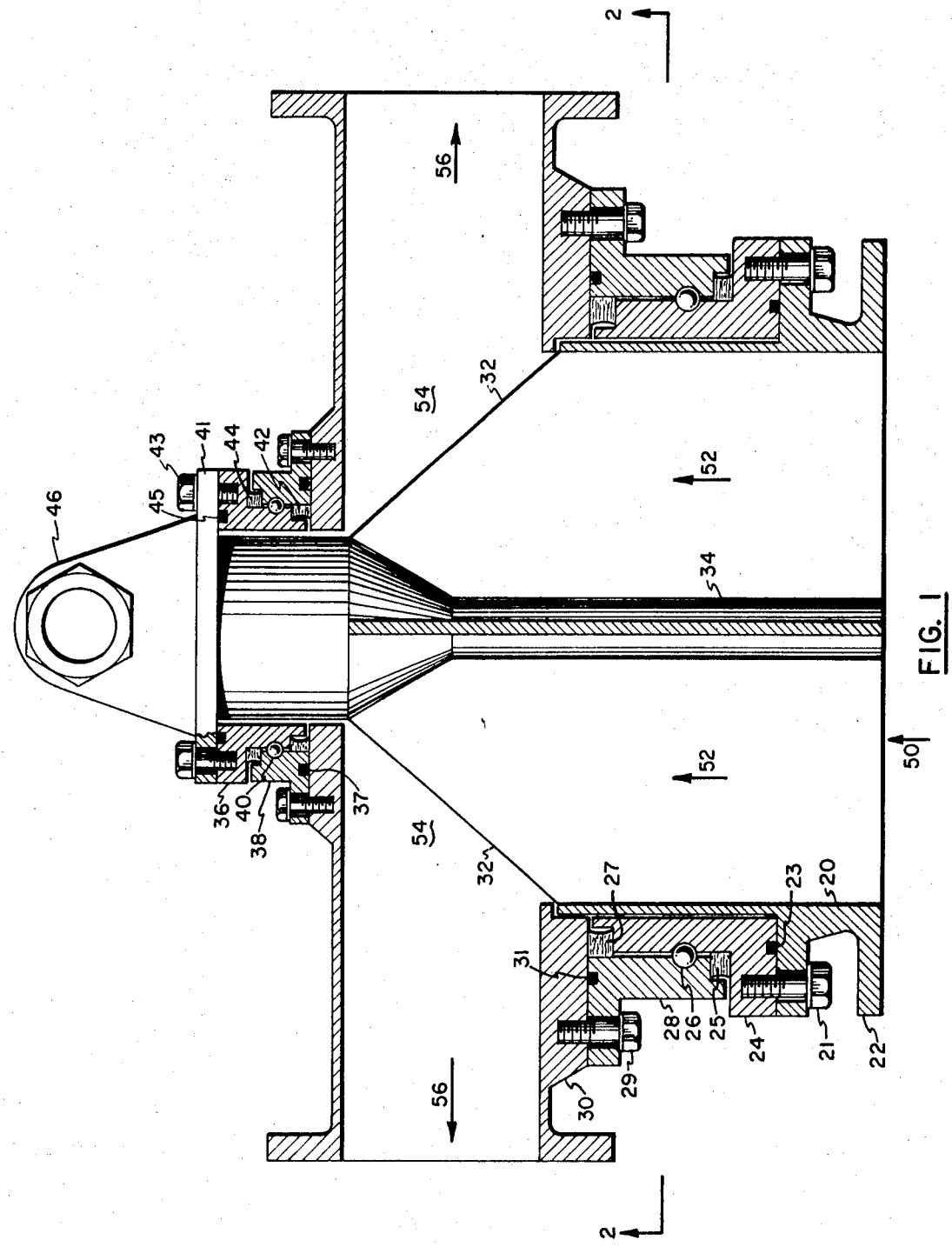
FIG. 1 represents a sectional view of a typical elevation of a swivel joint with a load bearing center.
Figure 2:
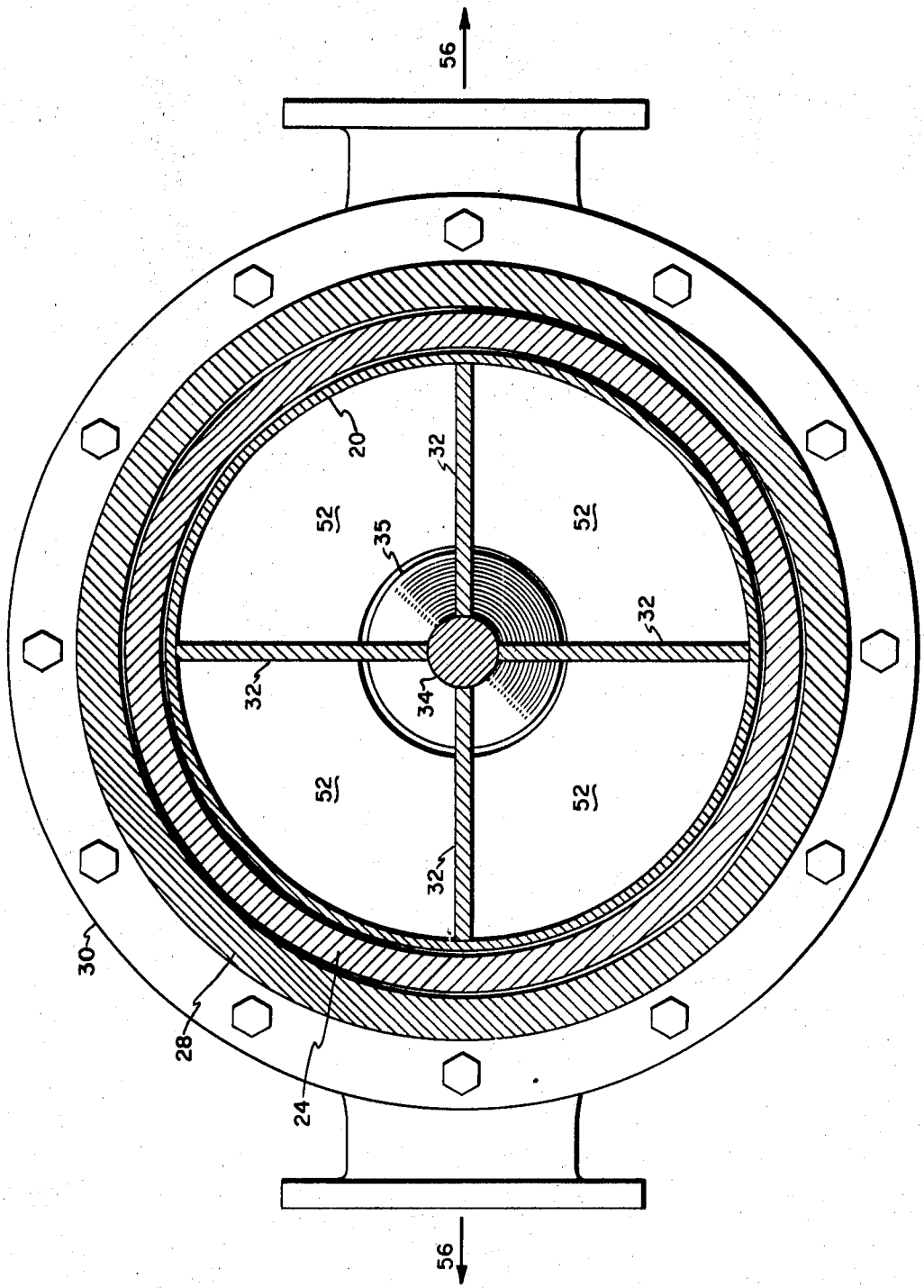
FIG. 2 represents a section taken substantially on the line 2—2 of FIG. 1.

Referring now to FIGS. 1 and 2, where identical numeral indicate identical parts, 20 indicates a cylindrical sleeve which has flange 22 for mounting to a rigid fluid conduit, such as the fluid conduit portion of the anchor leg described in Ser. No. 856,445 filed Sept. 9, 1969, which is to be assigned to the same assignee as that of the present application. Centrally located with respect to sleeve 20 is a shaft 34 which may either be a solid rod or a tube. Emanating from shaft 34 are webs 32 which extend along substantially the entire length of shaft 34, the ends of webs 32 being integrally connected to sleeve 20. The lower portion of shaft 34 may be dispensed with and the webs 32 may be joined to one another at the center. In this particular embodiment, sleeve 20 is integrally fastened to a lower stationary swivel ring 24 by means of bolts 21 and circumferentially sealed by an elastomeric sealing agent 23, e.g., silicone rubber O-ring. Of course, sleeve 20 and stationary ring 24 could be one body. Turning back to shaft 34, the shaft flares outwardly, as in a truncated conical section, and continues as a cylindrical section of a somewhat larger diameter than the lower part of the shaft. An upper stationary swivel ring 36 is disposed about the shaft and secured by flange 41 and bolts 43, the flange 41 being circumferentially sealed to the ring 36 by O-ring seals 45. The items so far described make up the load bearing nonrotating center member of the fluid swivel joint.

Now, circumferentially disposed around lower stationary swivel ring 24 is a lower rotatable swivel ring 28. Lower rotatable swivel ring 28 rotates about lower stationary swivel ring 24 by means of ball bearings 26 in ball races, machined in the swivel rings. The lower rotatable swivel ring 28 and lower stationary swivel ring 24 are maintained in circumferential sealing relationship by seals 25 and 27 which may be Teflon, silicone rubber, or other oil-water impermeable elastomeric sealing means. Integrally connected to rotatable swivel ring 28 by bolts 29 is housing 30. Circumferential sealing between the housing 30 and rotatable swivel ring 28 is maintained by elastomeric seal 31. Integrally connected to housing 30 by bolts 35 is upper rotatable swivel ring 38. Rotatable swivel ring 38 is maintained in circumferential sealing relationship with the housing 30 by sealing ring 37. Rotatable swivel ring 38 rotates about stationary swivel ring 36 on ball or roller bearings 40. Seals 42 and 44 maintain circumferential sealing relationship between swivel rings 36 and 38. If desired, the space between swivel rings 24 and 28 and swivel rings 36 and 38, respectively, may be packed with a water impermeable grease in order to lubricate the metal to metal bearing surfaces. Mounted at the top of shaft 34 is a mooring eye 46 for fastening an anchor chain. Housing 30 is provided with egress ports 56. Cargo conduits connected to ports 56 may extend to the ship for cargo loading and unloading.

The flow of fluid through the above-described assembly will now be described. A fluid, such as crude oil, flows upwardly through a fluid conduit into ingress port 50 at the lower end of sleeve 20. The oil flows upwardly through the channels 52 created within the sleeve 20 by shaft 34 and webs 32, into the cavity 54 in the housing 30 and then through the egress port 56 to other conduits leading to the ship.

The axial and bending load carrying feature will now be described. The flange 22 is rigidly attached to a load carrying structure. Fixed to the flange 22 is the sleeve 20. Webs 32 structurally interconnect shaft 34 with sleeve 20. Mooring eye 46 is mounted on shaft 34. These elements then constitute a rigid load carrying structure. The positioning of webs 34 within sleeve 20 creates a structure which is very rigid against both axial and bending loads applied to the eye 46. No load is carried by the swivel rings 24, 28, 36 and 38 or the housing 30. Therefore, the housing 30 is unhindered to rotate even when the structure is subjected to axial and/or bending load.

It must be remembered that the entire assembly will be either wholly or partially submerged when in use. Under conditions of use, frequent servicing or replacements of parts is neither desirable nor readily achieved. Consequently, the materials of construction must be capable of withstanding the elements and the corrosive effects of sea water.

Having now described the invention, of which modifications and variations will be obvious to those skilled in the art, the following claims will point out that which is believed to be the invention herein.

What is claimed is:

1. A fluid swivel joint capable of carrying substantial axial and bending loads which comprises, in combination:
 (i) a cylindrical sleeve having an inlet port at one end,
 (ii) a shaft coaxial with said sleeve,
 (iii) at least one radial web integrally connected to said shaft against relative movement thereto and extending outwardly from said shaft, the end of said web also being integrally connected to said sleeve,
 (iv) a housing circumferentially disposed about said web and in circumferential sealing relation with said sleeve and said shaft, said housing being freely rotatable with respect to said sleeve and said shaft, and having an outlet port in fluid communication with the inlet port of said sleeve.

2. The fluid swivel joint of claim 1 wherein first means including a stationary ring and a rotatable ring are operably disposed between said housing and said sleeve for permitting free relative rotation therebetween.

3. The fluid swivel joint of claim 2 wherein second means including a stationary ring and a rotatable ring are operably disposed between said housing and said shaft for permitting free relative rotation therebetween.

4. The fluid swivel joint of claim 3 wherein fluid sealing means is provided between each of said corresponding stationary rings and said rotatable rings.

5. A fluid swivel joint capable of carrying substantial axial and bending loads and adapted to be installed along the longitudinal axis of a load bearing fluid conduit which comprises, in combination:
 (i) a stationary body assembly comprising
  (a) a centrally located cylindrical shaft capable of supporting substantial axial and bending loads,
  (b) a plurality of webs connected to said shaft against relative movement thereto and extending radially from said shaft, and
  (c) a cylindrical sleeve having at one end thereof an inlet port, said sleeve circumscribing and being integrally connected to the outer ends of said webs, thereby creating separate channels between adjacent ones of said webs for the passage therethrough of fluid from said inlet port, and
 (ii) a freely rotatable swivel assembly comprising
  (a) a swivel housing circumferentially and externally disposed about said stationary body assembly and in circumferential sealing relation therewith, said swivel housing being freely rotatable with respect to said stationary body assembly and having an outlet port spaced from and in fluid communication with the inlet port of said body assembly.

6. A fluid swivel joint capable of carrying substantial axial and bending loads and adapted to be installed along the longitudinal axis of a load bearing fluid conduit which comprises, in combination:
 (i) a stationary body assembly comprising
  (a) a centrally located cylindrical shaft,
  (b) a plurality of webs radially extending from and for substantially the length of said shaft,
  (c) a cylindrical sleeve having at one end an inlet port and at the opposite end outlet port means disposed at opposite ends of said webs, said sleeve circumscribing and being integrally connected to the outer ends of said webs along the lower portion of said webs, thereby creating a plurality of separate channels within said sleeve for the passage of fluid between said inlet port and said outlet port,
  (d) a cylindrical lower stationary ring connected in circumscribing and concentric relation with said sleeve, and
  (e) a cylindrical upper stationary ring connected concentrically around said shaft axially spaced above said webs, whereby said body assembly is capable of supporting substantial axial and bending loads, and
 (ii) a freely rotatable swivel assembly comprising
  (a) a lower rotatable ring mounted externally of and in circumferential sealing relationship to said lower stationary ring,
  (b) an upper rotatable swivel ring mounted externally of and in circumferential sealing relation to said upper stationary ring, and
  (c) a housing mounted for free rotation relative said sleeve and housing and having at least one fluid conduit, said housing being operably connected in circumferential sealing relation with said upper and lower rotatable swivel rings and being disposed relative to said sleeve such that said fluid conduit communicates with said outlet port means of said sleeve, thereby creating a passageway for the transfer of fluid through said fluid swivel joint by way of said inlet port, said outlet port and said fluid conduit.

7. The fluid joint of claim 1 wherein said radial web extends axially for substantially the length of said shaft.

8. The fluid swivel joint of claim 5 wherein said webs extend longitudinally for substantially the length of said shaft.

9. The fluid swivel joint of claim 5 wherein said swivel housing operably is mounted in coaxial relationship with said cylindrical sleeve.

10. A fluid swivel joint capable of carrying substantial axial and bending loads and adapted for the passage of fluid therethrough comprising, in combination, first and second annular members operably mounted in coaxial relation for free relative rotation, a shaft centrally disposed of and coaxial with said first and second members, at least two radial webs integrally connected to said shaft against relative movement thereto and extending for substantially the length of said shaft, and being integrally connected with one of said first and second members so as to form a plurality of axially extending channels adapted for the passage of fluid therethrough, one of said first and second members being provided with an inlet port and the other of said first and second members being provided with an outlet port whereby said fluid swivel joint can transfer fluid therethrough.

References Cited

UNITED STATES PATENTS

| | | | |
|---|---|---|---|
| 2,270,928 | 1/1942 | Browne | 285—276 |
| 2,554,514 | 5/1951 | Wright et al. | 285—185X |

DAVE W. AROLA, Primary Examiner

U.S. Cl. X.R.

285—185, 276